United States Patent [19]

Notagashira

[11] Patent Number: 4,565,434
[45] Date of Patent: Jan. 21, 1986

[54] SIGNAL TRANSFERRING DEVICE FOR PHOTOGRAPHIC INSTRUMENT OR ACCESSORY

[75] Inventor: Hidehumi Notagashira, Kanagawa, Japan

[73] Assignee: Canon Kabushiki Kaisha, Tokyo, Japan

[21] Appl. No.: 458,972

[22] Filed: Jan. 18, 1983

[30] Foreign Application Priority Data

Feb. 15, 1982 [JP] Japan .................................. 57-22412
Mar. 10, 1982 [JP] Japan .................................. 57-37639

[51] Int. Cl.$^4$ ............................................. G03B 17/00
[52] U.S. Cl. .................................................. 354/286
[58] Field of Search ................. 354/286, 455; 339/41; 350/257

[56] References Cited

U.S. PATENT DOCUMENTS

| | | | |
|---|---|---|---|
| 2,893,302 | 7/1959 | Durst | 354/455 |
| 4,104,649 | 8/1978 | Tanaka et al. | 354/289.1 |
| 4,196,997 | 4/1980 | Ohmori et al. | 354/286 |
| 4,404,964 | 9/1983 | Kambara | 354/286 X |
| 4,413,893 | 11/1983 | Tomori | 354/286 X |
| 4,417,798 | 11/1983 | Ohkura et al. | 354/286 X |
| 4,448,509 | 5/1984 | Katsuma et al. | 354/286 |
| 4,461,523 | 7/1984 | Ustin et al. | 339/41 |

*Primary Examiner*—John Gonzales
*Attorney, Agent, or Firm*—Toren, McGeady, Stanger, Goldberg & Kiel

[57] ABSTRACT

A signal transferring device provided between a photographic instrument and an accessory therefor at such a location as not to give influence to attaching action and making it possible to transfer a great number of signals.

2 Claims, 5 Drawing Figures

SIGNAL TRANSFERRING DEVICE FOR PHOTOGRAPHIC INSTRUMENT OR ACCESSORY

BACKGROUND OF THE INVENTION

1. Field of the Invention

This invention relates to a signal transferring device for transmission, or reception, or transmission-reception, of electrical signals between a photographic instrument such as a single lens reflex camera or micro film camera using silver halide film, or a camera using video tape film, or a magnetic recording type camera, and an accessory such as an interchangeable lens or an intermediate tube attached to said photographic instrument.

2. Description of the Prior Art

In the art of photographic systems of mechanisms, taking an example of a single lens reflex camera and an interchangeable lens therefor, upon consideration of a system receptive of control signals from the camera body to control the operation of the individual mechanisms in the interchangeable lens mounting, for example, diaphragm, focusing lens, various filters, shutter and the like, and feasible to transmit electrical signals from all the above-described mechanisms to the camera body, a technical problem arises in the transfer of the electrical signals between the camera body and the interchangeable lens mounting.

The signal transferring device already known in the art has a form that electrical signal contact points or terminals are arranged on either mount surface (portion) of the camera body and the lens mounting so that the attachment of the lens to the camera body is completed, the electrical signal contact points or terminals come into engagement with the corresponding ones on the camera body.

The signal contacts in the device of such form are made either fixedly secured in prescribed positions on the camera housing or the lens casing, or movable as are given respective biasing forces by springs to obtain assurance of sufficient conduction therebetween.

In such conventional device, as the signal contacts are located inside, or on the surface of, the mount, it is in the former case that a problem arises from the large limitation on the availability of space, and in the latter case that when attaching, the contacts are caused to frictionally slide on the confronting surface of the opposite mount over the entire range of rotation of the lens relative to the camera body. This implies that the contacts unavoidably move across the heads of screw fasteners by which the mount ring is fixedly secured to the lens casing, or the camera housing, giving a problem that the tips of the contacts are worn off or contaminated with oil with the result of a loss in the electrical conduction. The maximum possible number of contacts to be provided in the interior of, or on the surface of, the mount is also largely limited.

SUMMARY OF THE INVENTION

A 1st object of the present invention is to provide a signal transferring device which does not allow for the contacting portions to be subjected to no more sliding movement than necessary when an accessory such as an interchangeable lens is being attached to a photographic instrument such as a camera, thereby the aforesaid contacting portions are protected from the contamination with oil, and abrasion, and the electrical conduction can be perfectly assured.

A 2nd object of the present invention is to provide for at least one of the accessory and photographic instrument with an arrangement of a plurality of electrical signal transferring members outside, or on an outer peripheral portion, of the mount, to thereby ease the problem of the disturbing reflection, mutilation of some of the image forming light rays as the electrical signal transfer members are increased in number with sacrificing the limitation of the space.

A 3rd object of the present invention is to provide a signal transferring device having two sets of contacts one of which is on the accessory and other which is on the photographic instrument, whereby at least one set of a plurality of electrical signal transferring members are made movable in a given direction, and arranged to move in the aforesaid given direction successively to establish conduction to the respective electrical signal transferring members in the opposite set as the attaching operation of the accessory to the photographic instrument goes on progressively so that a protection from dust and water drops is achieved, thereby it being made possible to transfer signals with high reliability.

A further object of the present invention is to provide a signal transferring device having a protection member for protecting the aforesaid electrical signal transferring members from dust and water particles, wherein when the accessory is out of use with the photographic instrument, the aforesaid signal transferring members are shielded against the dust and water particles by said protection member, and when the accessory is in use, the protection member is retracted to permit the signal transferring members to be brought into electrical connection with the respective opposite signal transferring members.

A furthermore object of the present invention is to provide means for solving the problem that arises from the lack of a space large enough to accommodate the required number of members for transmission-reception of electrical signals as is encountered with the combination of a camera and an interchangeable lens which are coupled with each other in a narrow area.

BRIEF DESCRIPTION OF THE DRAWINGS

FIG. 2 is a fragmentary sectional view illustrating a manner in which the device operates when the lens is being attached to the camera body.

DETAILED DESCRIPTION OF THE PREFERRED EMBODIMENT

Figure 1:
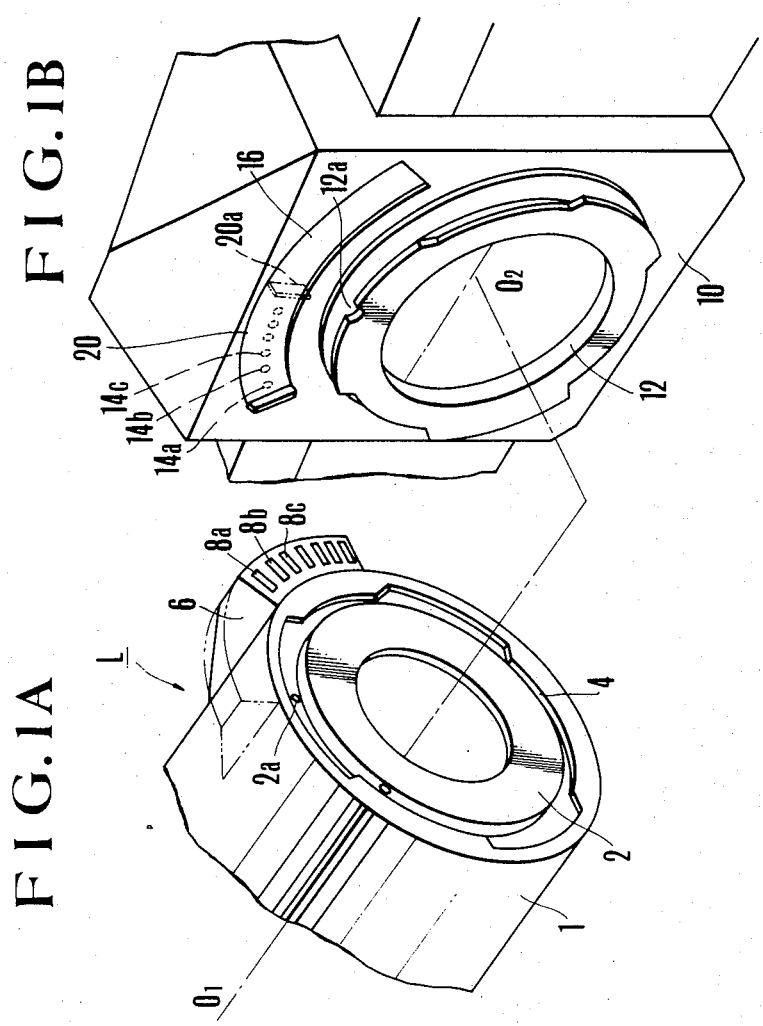
FIGS. 1 and 2 illustrate an example of application of the present invention to a camera with an interchangeable lens, with FIG. 1A being a perspective view of the main parts of the interchangeable lens, and FIG. 1B being a perspective view of the main parts of the camera housing.

The present invention will next be described in connection with an embodiment thereof by reference to the drawings FIG. 1A illustrates a coupling means (mount means) of an interchangeable lens mounting with an electrical signal transferring device and FIG. 1B an opposite coupling means on a camera housing to which said interchangeable lens is to be attached with the electrical signal transferring device.

In the drawings, L denotes the interchangeable lens, said interchangeable lens L having an outer barrel 1 and a mount member 2, and said outer barrel being arranged to be rotatable relative to the mount member 2. At the rear end of the outer barrel 1 there is shown a coupling means 4 such as a bayonet mount.

6 is a casing containing a set of electrical signal transferring members and formed as radially projected from the outer pheriphery of the outer barrel 1.

Figure 3:
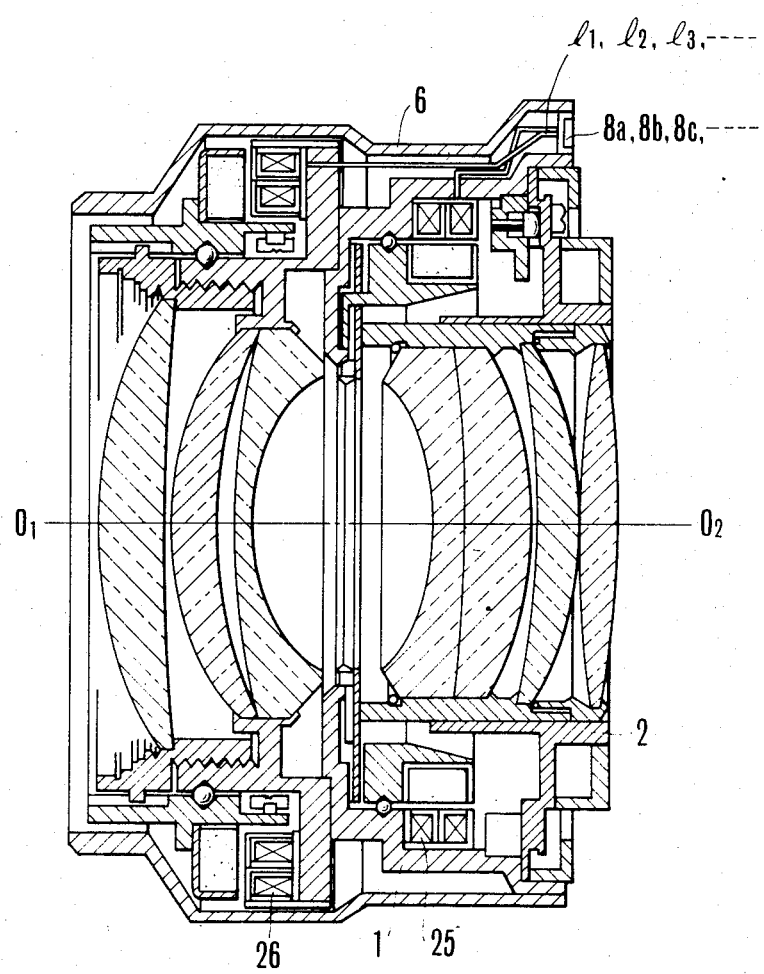
FIG. 3 is a sectional view of the lens taken along the optical axis of FIG. 1A.

The electrical signal transferring members 8a, 8b, . . . transmit and receive electrical signals such as those representing the actual voltage of the battery, the maximum possible size of aperture opening, the correction factors of aperture for the individual interchangeable lenses, the automatic detection of the in-focus condition from the camera body to the lens, are arranged in one and the same circle with the center at an optical axis 01-02, and electrically connected through respective signal lines 11, 12, . . . to a diaphragm drive motor 25, focusing lens drive motor 26, etc. in the lens mounting of FIG. 3.

10 is a camera housing; 12 is a camera side bayonet member; and 14 is a camera side electrical signal transferring device having the same number of members 14a, 14b, . . . as that of the aforesaid lens side signal transferring members 18a, 18b, . . .

Figure 2:
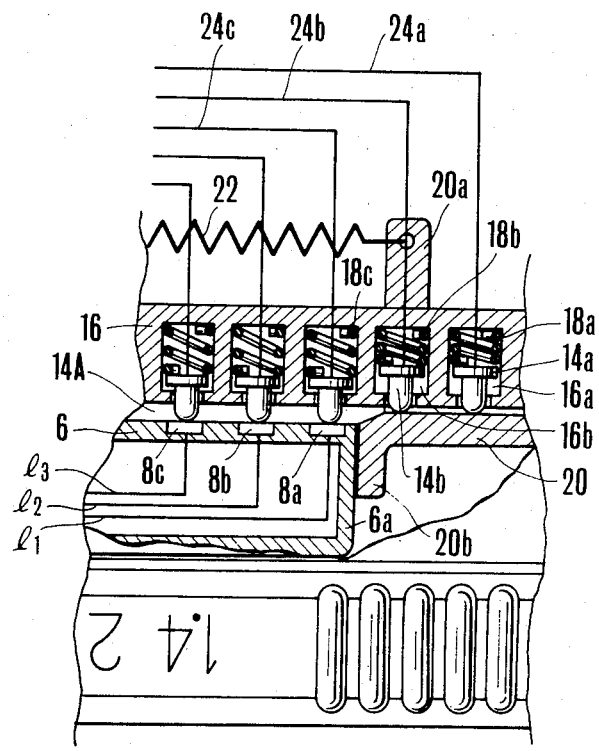

As illustrated in FIG. 2, the electrical signal transferring members on the camera body are movably fitted in respective accommodation holes 16a, 16b, . . . provided in the front panel of the camera housing or a base plate 16 of the signal transferring device and are urged always in one direction by bias springs 18a, 18b, . . .

20 is a protecting member for protecting the aforesaid camera side signal transferring members 14a, 14b, 14c, said protection member 20 covering up an open space 14A into which the tips of the camera side signal transferring members 14a, 14b, . . . project outwardly. Between one end 20a of the aforesaid protection member 20 and the camera housing is tensioned a spring 22 by which the protection member 20 is urged so as to shut off the aforesaid open space 14A.

24a, 24b, 24c, . . . are signal lines connected to the camera side signal transferring members 14a, 14b, 14c, . . . at their one ends, the opposite ends of which are connected to an exposure control circuit (not shown), an electrical power supply circuit (not shown), and a focusing control circuit (not shown) in the camera housing.

The operation of the device is as follows:

Before the interchangeable lens L is attached to the camera housing, the aforesaid protection member 20 assumes to close the window 14A under the action of the spring 22 and to hold the camera side signal transferring members 14a, 14b, 14c, . . . pushed down into the accommodation holes 16a, 16b, 16c, . . . against the aforesaid bias springs 18a, 18b, 18c, . . . (therefore, it is possible to protect the signal transferring member from dust, water particles, or the like). Then, the interchangeable lens L is to be attached to the camera body. The operator will first bring a position index pin 2a on the mount member 2 of the interchangeable lens mounting into engagement with a cutout portion 12a of the opposite mount member 12 on the camera housing, then put the bayonet members of the lens mounting and the camera body into mating relation with each other and then rotate the outer barrel 1 while holding the camera body stationary. During this attaching operation, one end 6a of the aforesaid lens side signal transferring member holder 6 is in engagement with a portion or protuberance 20b of the aforesaid protection member 20. Since this holder 6 is contiguous to the outer barrel 1, as the outer barrel 1 rotates, the holder 6 rotates about the optical axis relative to the aforesaid mount member 2 as illustrated in FIG. 1. Therefore, as illustrated in FIG. 2, as rotation of the outer barrel 1 goes on, the one end 6a of the aforesaid holder 6 gradually opens the protection member 20, clearing of the confronting surface, against the force of the spring 22, while the signal transferring members 14a, 14b, 14c, . . . in the camera body being caused to successively move into electrically connectable positions with the lens side signal transferring members 8a, 8b, 8c, . . . when the lens L gets stopped from further rotation by a click (not shown), the signal transferring members on the outer barrel 1 and the camera housing 10 are in electrical connection with each other in each pair.

Thus the lens L and the camera body are rendered electrically conductive to each other through the paired-up signal transferring members between the camera body and the lens.

As has been described above, the present invention is to arrange the signal transferring members 14a, 14b, . . . to be movable in a given direction, and upon attachment of the interchangeable lens to the camera body to move in the aforesaid given direction successively with the limitation of their sliding movement to a minimum, thereby giving an advantage that, because of the unnecessity of slidingly moving the signal transferring members on the mount over the entire range of rotation of the lens barrel relative to the camera housing as in the prior art, as such total sliding movement is remarkably reduced, the tips of the signal transferring members are hardly worn out.

Further, the present invention is to control the timing of projection and retraction of the movable signal transferring members in accordance with opening and closing of the protection member, thereby an otherwise necessary mechanism of large size and complicated structure for controlling the movement of the signal transferring members on the camera housing can be omitted. This allows the signal transferring device to be arranged near the coupling means of the camera housing or the lens mounting.

It should be pointed out in connection with the above-described embodiment that since the inner surface of the aforesaid protection member 20 is always in contact with all the signal transferring members 14a, 14b, 14c, . . . and also since it passes over the tips of the latter each time the lens is attached to and detached from the camera body, use may be made of a cleaning brush or cloth sheet on the inner surface of the protection member in order to insure that good electrical connection can be always established.

In the above-described embodiment, when to detach the lens from the camera body, the lens is turned in the reversed direction to that in which the lens is attached. Responsive to this dataching operation, the aforesaid protection member 20 is driven by the spring 22 to move in a direction to close the open area 14A, while simultaneously retracting the camera side signal transferring members 14a, 14b, 14c, . . . into the aforesaid accommodation holes 16a, 16b, 16c, . . . against the forces of the springs 18a, 18b, 18c, . . . Thus there is no need of using a particular member for retracting the signal transferring members.

The above-described embodiment may be modified such that while the signal transferring members on the camera housing are fixedly secured, the opposite ones on the outer barrel are made axially movable under the action of a bias spring and the protection member 20 is made to function as an actuator therefor.

Figure 4:
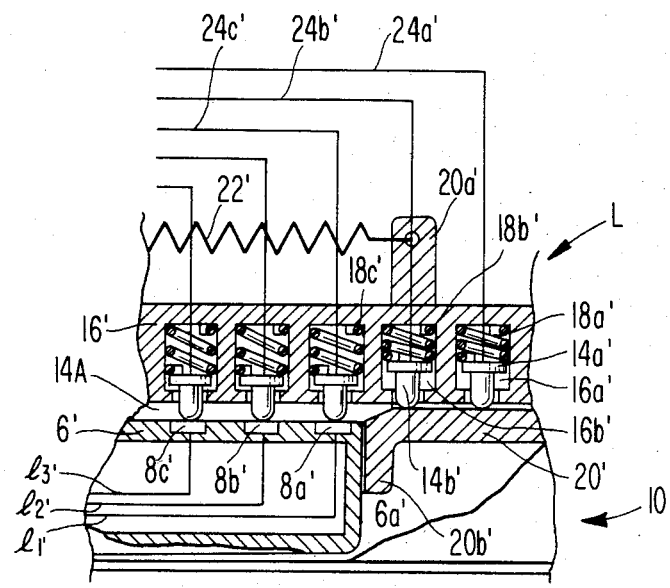
FIG. 4 is a fragmentary sectional view also illustrating a lens coupled to a camera and showing an embodiment of the invention.

This is shown in FIG. 4 where elements 6', 6a', 8a', 8b', 8c', 20', 20b', and 11', 12', 13', correspond to elements 6, 6a, 8a, 8b, 8c, 20, 20b, and 11, 12, 13, of FIG. 2 but are part of the camera housing 10. Members 16', 16a', 16b', 14a', 14b', 18a', 18b', 18c', 20a', 22' and 24a', 24b', 24c', correspond to their unprimed reference characters in FIG. 2, but are part of the lens L.

Though the present invention has been described as applied to the camera with the interchangeable lens, it is also applicable to a video camera with its interchangeable lens, and other photographic instruments with their accessories including strobes and filter units with the result that the reliability of electrically connecting operation between the body of the instrument and the accessory attached thereto can be improved.

Further in the above-described embodiment of the interchangeable lens L, the holder 6 of the lens side electrical signal transferring members 8a, 8b, 8c, . . . is arranged as radially projecting outwardly of the outer barrel 1, thereby it being made possible to avoid the requirement of arranging the electrical signal transferring members within the narrow mount surface. Thus, the possibility of transmitting and receiving a greatly increased number of electrical signals has been achieved.

What I claim:

1. A signal transmitting device for transmitting electrical signals between a camera having an actuating member and an interchangeable lens assembly having an optical axis, comprising:

an interchangeable lens barrel having a base plate with holes, coupling means for mounting said interchangeable lens barrel on a camera, said coupling means being coupled with complementary coupling means on the camera;

a plurality of electrical signal terminals arranged on the outside of said coupling means on a circle concentric with the optical axis, said electrical signal terminals being inserted into the holes formed in the base plate, first spring members for biasing said terminals so that ends of said terminals project out of said holes toward the camera; and a protecting member on the lens barrel for protecting said electrical signal terminals, said protecting member being movable concentrically about the optical axis so as to cover ends of said electrical signal terminals, a second spring member for moving said protecting member, when said interchangeable lens barrel is dismounted from the camera, along said electrical signal terminals so as to cover said electrical signal terminals, said protecting member being opened by the actuating member against the force of said second spring member when said interchangeable lens barrel is mounted on the camera, so that said electrical signal terminals transmit the electrical signals between the camera and the interchangeable lens assembly at a position when the coupling of said coupling means and said complementary coupling means is completed;

said electrical signal terminals applying pressure contact on a reverse side of said protecting member in response to said first spring members, and move slidingly over the reverse side when said protecting member is opened.

2. A signal transmitting device for performing a transmission-reception of electrical signals with an interchangeable lens assembly having an optical axis and an actuating member, comprising:

a camera body defining an optical axis coincident with the lens optical axis when the lens is mounted on the camera body, said camera body having holes;

camera coupling means for mounting said interchangeable lens assembly on said camera body;

a plurality of electrical signal terminals arranged on said camera coupling means along a circular path concentric with the optical axis, said electrical signal terminals being inserted into holes formed at said camera body, first spring members for biasing said terminals so they project out of said holes toward the interchangeable lens assembly when the lens assembly is coupled to the camera; and a member for protecting said electrical signal terminals, a second spring member for biasing said protecting member concentrically about the optical axis so as to cover ends of said electrical signal terminals and to move said protecting member when said interchangeable lens barrel is dismounted from the camera, along the circular path, said protecting member being moved by the actuating member when said interchangeable lens barrel is mounted on the camera against the resilient force of said spring member so as to open the protecting member so that said electrical signal terminals transmit the electrical signals between the camera and the interchangeable lens assembly at a position at which the coupling of said camera coupling means and the lens assembly is completed;

said electrical signal terminals being arranged to pressure contact a reverse side of said protecting member by said first spring members and move slidingly over said reverse side as said protecting member is opened.

* * * * *